Figure 1:
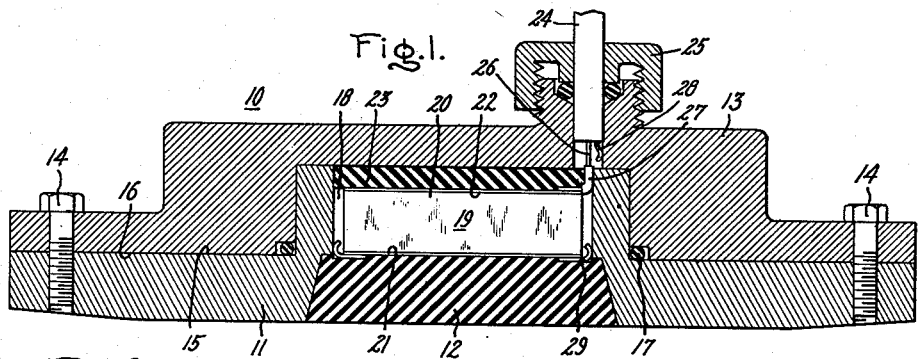

March 8, 1960     R. W. SAMSEL ET AL     2,928,068
COMPRESSIONAL WAVE TRANSDUCER AND METHOD OF MAKING THE SAME
Filed March 25, 1952

DOTTED NUMERALS REPRESENT
PIEZOELECTRIC CONSTANT IN
STATCOULOMBS/DYNE X $10^{-7}$

Inventors:
Richard W. Samsel,
Gene R. Peterson,
by Paul A. Frank
Their Attorney.

United States Patent Office 2,928,068
Patented Mar. 8, 1960

2,928,068

COMPRESSIONAL WAVE TRANSDUCER AND METHOD OF MAKING THE SAME

Richard W. Samsel, Scotia, and Gene R. Peterson, Schenectady, N.Y., assignors to General Electric Company, a corporation of New York Application March 25, 1952, Serial No. 278,522

11 Claims. (Cl. 340—10)

The invention relates to compressional wave transducers and more particularly to compressional wave transducers suitable for use as compressional wave transmitting or receiving components in underwater object locating systems.

An important object of the invention is to provide a compressional wave transducer having a predetermined desired transmission or sensitivity pattern, and particularly a transducer capable of a highly directive compressional wave energy transducing pattern with a minimum of side lobes of transmission or reception. Another object of the invention is to provide a highly efficient compressional wave transducer having a simple, inexpensive, and sturdy construction.

A further object of the invention is to provide new methods of making compressional wave transducers capable of fulfilling the foregoing objects.

A still further specific object of the invention is to provide a compressional wave transducer employing a single piezoelectric element having a directive transmission or sensitivity pattern, thus eliminating the necessity for an entire linear array or mosaic of individual piezoelectric elements customarily necessary to achieve such directive patterns.

In general, in accord with the invention, a body of ferroelectric ceramic material, such as comprising primarily barium titanate, having opposing major faces, is activated to exhibit remanent piezoelectric properties along parallel lines of the body but with different intensities of polarization in different regions of the body in accordance with a function or characteristic determined by the desired pattern of compressional wave transmission or reception. The word "ferroelectric" is employed in the art to define materials capable of being electrically polarized, and is analogous to the word "ferromagnetic" commonly employed to define materials capable of magnetic polarization. The gradation of piezoelectric polarization intensity in adjacent activated regions of the body may be made to approximate a continuous function, such as, for example, a cosine wave. Consequently, the error introduced into the integrated mechanical or electrical output of the transducer as a result of discontinuities between discrete piezoelectric crystals or other compressional wave transducing elements, as in the customary linear array or mosaic of such elements, is minimized.

In accordance with the invention only a single pair of electrodes making contact to opposite faces of the ceramic body normal to the direction of polarization therein need be employed in the completed transducer. A plurality of spaced electrodes making contact with at least one face of the ceramic body can be employed, however, during the piezoelectric activation of the body. Unidirectional voltages having different potential gradients are supplied across the body between a common electrode covering the opposite face thereof and each of these discrete electrodes. If the potential gradient between adjacent ones of these discrete electrodes is low enough to inhibit arcing, the different voltages may be impressed across the ceramic body simultaneously. With high potential gradients between adjacent electrodes on one face of the body, the activating voltages must, of course, be supplied sequentially. After the entire ceramic body has been activated in accordance with the desired polarization intensity function, the discrete electrodes contacting one face of the body may be replaced by a single encompassing electrode.

Figure 2:
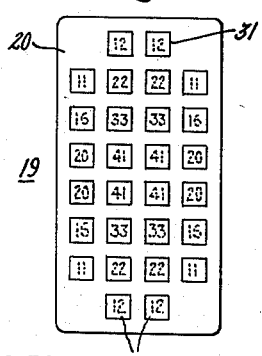
Figure 3:
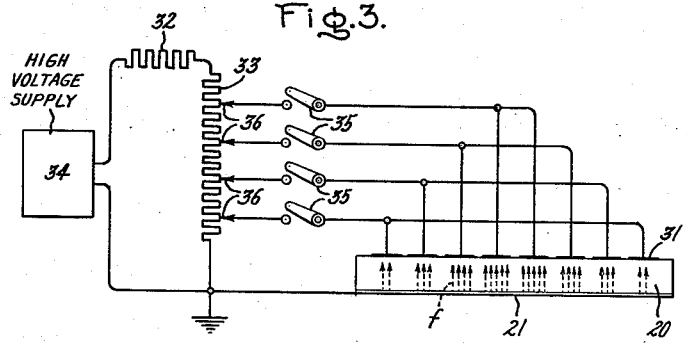
Figure 4:
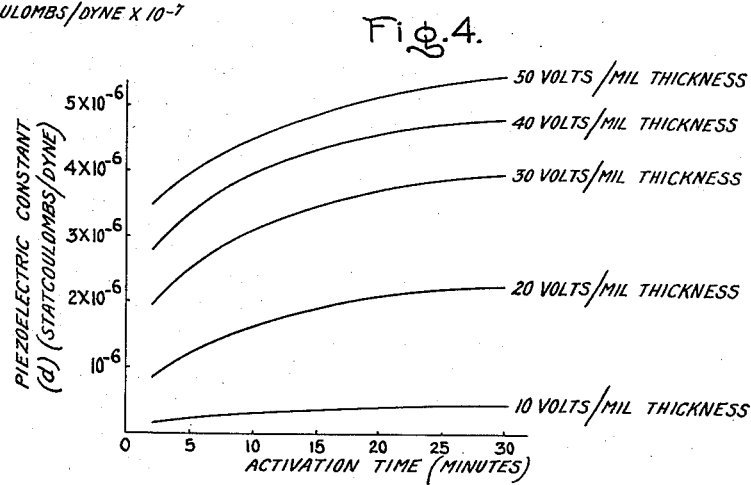

Novel features which we believe to be characteristic of the invention are set forth in the appended claims. The invention itself, however, together with further objects and advantages thereof may best be understood by referring to the following description taken in connection with the accompanying drawing in which Fig. 1 is a cross sectional view of a compressional wave transducer assembly employing the invention; Fig. 2 is a plan view of the compressional wave energy transducing element of the transducer of Fig. 1 before activation; Fig. 3 is a schematic diagram illustrating a method which may be employed in the piezoelectric activation of the transducing element of Fig. 2; and Fig. 4 is a family of curves illustrating typical activation times and polarizing potentials to be employed to obtain a desired piezoelectric constant in a barium titanate ceramic slab.

Referring to Fig. 1, one form of the invention is shown as embodied in a transducer assembly 10 comprising a front metallic casing 11 having a central rubber-like diaphragm 12 constituting a compressional wave energy transmitting window. Diaphragm 12 is preferably composed of a resilient material having compressional wave transmission characteristics substantially identical with the transmission characteristics of the medium through which the compressional wave energy is to be propagated. Diaphragm 12 is hermetically sealed around its periphery to casing 11. A back metallic casing 13 is secured to front casing 11 by such means as bolts 14. Casings 11 and 13 have conforming internal surfaces 15 and 16 and an embedded O-ring 17 compressed between the respective conforming internal surfaces 15 and 16 thereof. Casings 11 and 13 are constructed to define a completely internal hermetically sealed cavity 18 located immediately behind diaphragm 12. A compressional wave transducer 19 constructed in accord with the invention is located within this cavity 18. Transducer 19 is shown as a rectangular slab 20 of ferroelectric ceramic material, such as ceramics of barium titanate or ceramics of barium titanate with additions of alkaline earth metals, activated as described hereinafter and having a pair of conducting electrodes 21 and 22, preferably film-like, in contact with opposing major faces of the slab 20. Slab 20 constitutes the piezoelectric element and preferably has length and width dimensions substantially greater than the thickness dimension normal to the plane of the electrode contacting faces in order to reduce problems of mechanical coupling. If it is desired that transducer 19 simulate a linear array, slab 20 may be made in the form of a narrow strip instead of the illustrated rectangular shape. It is preferable, however, that slab 20 have a thickness dimension smaller than at least one other dimension. As is well known in the art, the thickness dimension controls to a considerable extent the resonant frequency of the ceramic slab 20 and the optimum operational frequency of the transducer assembly 10.

Transducer 19 may be embedded between the rubber diaphragm 12 and a resilient backing plate 23 in order to allow the transducer to withstand high pressures and is preferably rigidly secured thereto by suitable cementitious material or by a cycle-weld process. This backing plate 23 is not always necessary. When it is omitted the remaining space may be filled with air or other media. Suitable means for providing electrical connection to electrodes 21 and 22 is shown as comprising an input cable 24 of the concentric conductor type inserted within a suitable cable sealing connector 25. An inner conductor 26 of cable 24 is inserted through an insulating sleeve 27, and is secured in contact at its inner end to electrode 22 by such means as soldering. Outer concentric conductor 28 of cable 24 may be directly connected to casing 13, as shown, and the electrical circuit to electrode 21 completed by virtue of a conducting clip 29 connected between electrode 21 and casing 11.

Referring now to Figs. 2 and 3, we have diagrammatically illustrated one method of making the piezoelectric transducer 19 included in the transducer assembly 10 of Fig. 1. A plurality of discrete electrodes 31 are initially placed adjacent to or in contact with at least one face of slab 20. Electrodes 31 may be insulated from one another by such means as being merely spaced apart across the face of the slab. The opposite face of slab 20 may be covered with correspondingly aligned spaced electrodes, but preferably is completely covered by a single electrode 21 which may conveniently comprise the electrode 21 included in the completely constructed transducer 19. Electrodes 31 may then be employed in conjunction with electrode 21 to provide a number of independent polarizing electric fields designated by dashed lines $f$ passing through the thickness of slab 20 by virtue of suitable connection to polarizing potentials. One convenient manner of connection to such polarizing potentials is shown in Fig. 3 as comprising a voltage divider including a resistor 32 and a multi-tapped potentiometer 33 connected in series with a high voltage supply 34. Those electrodes 31 which overlie portions of slab 20 that are to be subjected to equal intensity piezoelectric polarization are connected together through a suitable switch 35 to one of the taps 36 of potentiometer 33. One end of potentiometer 33 is connected to electrode 21, and taps 36 are individually adjusted to provide a proper potential gradient between electrode 21 and each of the electrodes 31. If the potential gradients existing between adjacent electrodes 31 by virtue of the potential difference between the various taps 36 of potentiometer 33 are such as to produce arcing between these adjacent electrodes, only one switch 35 should be closed at any interval of time. On the other hand, if no arcing is likely to occur, all switches 35 may be closed simultaneously and the slab 20 completely polarized in a thickness mode of polarization in one operation.

The magnitude of the polarizing electric field and activation time required to produce polarization of desired intensity across a portion of a ferroelectric ceramic slab of given thickness is now well known in the art. The magnitude or intensity of remanent piezoelectric polarization produced in the slab is normally expressed in terms of a piezoelectric constant defined as the number of statcoulombs per $dyne \times 10^{-7}$; statcoulombs being a measure of electrical charge, and dynes being a measure of mechanical force. A typical family of curves of piezoelectric constant vs. activation time for a plurality of different polarizing voltages for barium titanate ceramic elements is illustrated in Fig. 4. The curves are exemplary of barium titanate ceramic only, and the requisite polarizing potentials vary considerably with other types of ferroelectric ceramics or with ceramics of barium titanate combined with various additives, as is well known in the art. The piezoelectric constants indicated by the curves of Fig. 4 were measured shortly after activation, and it will be understood that there may be a deterioration thereof over a long period of time. It is, of course, a simple matter to overcome any such deterioration by a successive activation at a slightly higher polarizing potential, if necessary.

In producing a transducer 19 having a directive transmission or sensitivity pattern with minimum side lobes, it has been found preferable to activate the central regions of slab 20 to have a higher piezoelectric constant than the peripheral regions. If a narrow ceramic strip is substituted for slab 20 in order to simulate a linear array of piezo-electric elements rather than an entire mosaic thereof, the central region of the strip should similarly be activated to have a higher piezoelectric constant than the region on either side of this central region. In Fig. 2 we have designated by dotted numerals a gradation of piezoelectric constants in areas coextensive with the individual electrodes 31 such as might be employed to produce a highly directive energy transducing pattern in the illustrated rectangular slab 20; the dotted numerals representing the piezoelectric constant in statcoulombs/ $dyne \times 10^{-7}$. The degree of piezoelectric polarization intensity variation over the area of slab 20 necessary to provide other patterns of compressional wave radiation can be determined by methods well known to the art. For optimum results, the piezoelectric activation over the radiating face of the slab 20 should be closely proportional to the Fourier transform of the desired energy transducing pattern.

Once slab 20 has been properly polarized with the desired characteristic of piezoelectric activation across the face of the slab, electrodes 31 may be removed and a single electrode 21 substituted therefor, or electrodes 31 may be interconnected by suitable connecting conductors. The resulting piezoelectric transducer 19 may then be employed in the transducer assembly 10.

Although we have shown a particular embodiment of the invention, many modifications may be made. The ceramic transducer 19 may, for some applications, be constructed to utilize a ceramic body having a curved surface or one in the form of a cylinder instead of a flat slab as illustrated. It is to be understood, therefore, that we intend to cover by the appended claims all of such modifications as fall within the true spirit and scope of the invention.

What we claim as new and desire to secure by Letters Patent of the United States is:

1. A compressional wave transducer comprising a body of ferroelectric ceramic material having opposing major faces, and a pair of electrodes in respective aligned contact with opposing major faces thereof, said body having piezoelectric polarization in the direction perpendicular to the electrodes over the region of said body between said electrodes and each electrode-to-electrode portion of said region having different predetermined intensities of polarization.

2. A compressional wave transducer comprising a body of ferroelectric ceramic material having opposing major faces, and a pair of electrodes in respective aligned contact with opposing faces thereof, said body being polarized in the region of the body between said electrodes in the direction perpendicular to the electrodes and with different piezoelectric constants in different electrode-to-electrode polarized portions of said region.

3. A compressional wave transducer comprising a ceramic body of primarily barium titanate, said body having one dimension smaller than at least one other dimension and being polarized parallel to said one dimension to have different piezoelectric constants in different adjacent polarized portions along a line perpendicular to said one dimension thereof, and at least one pair of electrodes in contact with opposite faces of the body perpendicular to said one dimension over a contact area substantially coextensive with the polarized portions thereof.

4. A directive compressional wave transducer comprising a ferroelectric slab comprising primarily barium titanate, said slab having length and width dimensions larger than its thickness dimension and having thickness mode remanent piezoelectric polarization with a higher piezoelectric constant in a central region of said slab than that subsisting in polarized regions along its length and adjacent to said central region, and a pair of electrodes in contact with opposite faces of the slab perpendicular to its thickness dimension over a contact area substantially coextensive with the polarized regions thereof.

5. A piezoelectric element comprising a body of ferroelectric ceramic material comprising primarily barium titanate, said body having one dimension smaller than at least one other dimension and being unidirectionally piezoelectrically polarized parallel to said one dimension with polarizing voltages of different magnitudes whereby different polarized portions along said other dimension of said body have different piezoelectric constants.

6. A piezoelectric element comprising a ferroelectric ceramic slab composed of primarily barium titanate, said slab having length and width dimensions larger than its thickness dimension and having thickness mode remanent piezoelecrtic polarization with a higher piezoelectric constant in a central region of said slab than that subsisting in polarized regions along its length and adjacent said central region.

7. The method of making a compressional wave transducer from a ferroelectric ceramic body, which method comprises activating different adjacent portions of the body to have thickness mode piezoelectricity of different piezoelectric constants, and securing a pair of electrodes in contact with opposite faces of the body normal to its thickness dimension over a contact area substantially coextensive with the different polarized portions thereof.

8. The method of making a compressional wave transducer from a ferroelectric ceramic body having a thickness dimension smaller than at least one other dimension, which method comprises piezoelectrically activating the body by temporarily applying, parallel to its thickness dimension, electric fields of different polarizing intensities through different adjacent portions of the body, and securing a pair of electrodes in contact with opposite faces of the body normal to its thickness dimension over a contact area substantially coextensive with the different polarized portions thereof.

9. The method of making a piezoelectric element from a ferroelectric ceramic slab having opposing major faces, which method comprises securing a plurality of electrodes in spaced contact with one major face of the slab, securing at least one other electrode in contact with the opposite major face over an area aligned to and substantially coextensive with the contact area of the plurality of electrodes on said one face, and piezoelectrically activating the slab to have different piezoelectric constants in different portions thereof by temporarily applying different polarizing potentials between the electrodes aligned on opposite sides of the slab.

10. The method of making a piezoelectric element from a ferroelectric ceramic slab having opposing major faces, which method comprises securing a plurality of electrodes in spaced contact with one major face of the slab, securing at least one other electrode in contact with the opposite major face over an area aligned to and substantially coextensive with the contact area of the plurality of electrodes on said one face, and piezoelectrically activating the slab to have a higher piezoelectric constant in a central region than in adjacent regions thereof by temporarily applying higher polarizing potentials between the centrally located electrodes aligned on opposite sides of the slab than the polarizing potentials applied across the oppositely aligned electrodes adjacent said centrally located electrodes.

11. A piezoelectric element comprising a body of ferroelectric ceramic material composed primarily of barium titanate, said body having one dimension smaller than at least one other dimension and being unidirectionally piezoelectrically polarized parallel to said one dimension with a higher piezoelectric constant in a central region of said body than that subsisting in polarized regions along said other dimension and adjacent to said central region.

References Cited in the file of this patent

UNITED STATES PATENTS

| | | |
|---|---|---|
| 2,269,403 | Williams | Jan. 6, 1942 |
| 2,411,551 | Mason | Nov. 26, 1946 |
| 2,468,301 | Mason | Apr. 26, 1949 |
| 2,515,446 | Gravley | July 18, 1950 |
| 2,540,412 | Adler | Feb. 6, 1951 |
| 2,565,159 | Williams | Aug. 21, 1951 |
| 2,592,703 | Jaffe | Apr. 15, 1952 |
| 2,624,853 | Page | Jan. 6, 1953 |